US008613060B2

(12) United States Patent
Lu et al.

(10) Patent No.: US 8,613,060 B2
(45) Date of Patent: Dec. 17, 2013

(54) LOGON SYSTEM AND METHOD THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 592 days.

(21) Appl. No.: 12/647,848

(22) Filed: Dec. 28, 2009

(65) Prior Publication Data

US 2010/0115465 A1    May 6, 2010

(30) Foreign Application Priority Data

Dec. 30, 2008  (CN) .......................... 2008 1 0247546

(51) Int. Cl.
  *G06F 7/04*      (2006.01)
  *G06F 15/16*     (2006.01)
  *G06F 17/30*     (2006.01)
  *H04L 29/06*     (2006.01)

(52) U.S. Cl.
   USPC .............................................. 726/5; 713/189

(58) Field of Classification Search
   USPC .......... 713/185, 175, 173, 182; 726/5, 16–17, 726/19–20
   See application file for complete search history.

(56) References Cited

U.S. PATENT DOCUMENTS

| 7,734,912 | B2* | 6/2010 | Ganesan et al. | 713/155 |
| 2005/0076198 | A1* | 4/2005 | Skomra et al. | 713/156 |
| 2005/0091213 | A1* | 4/2005 | Schutz et al. | 707/9 |
| 2006/0282678 | A1* | 12/2006 | Ali et al. | 713/185 |
| 2007/0106894 | A1* | 5/2007 | Zhang et al. | 713/170 |
| 2008/0115208 | A1* | 5/2008 | Lee | 726/19 |
| 2009/0288143 | A1* | 11/2009 | Stebila et al. | 726/3 |
| 2010/0242102 | A1* | 9/2010 | Cross et al. | 726/7 |
| 2012/0017268 | A9* | 1/2012 | Dispensa | 726/7 |

FOREIGN PATENT DOCUMENTS

| CN | 1553348 A | 12/2004 |
| CN | 101286848 A | 10/2008 |

OTHER PUBLICATIONS

David P. Jablon; Strong Password-Only Authenticated Key Exchange; Sep. 25, 1996; ACM; pp. 1-22.*

* cited by examiner

*Primary Examiner* — Mohammad W Reza
*Assistant Examiner* — Monjour Rahim
(74) *Attorney, Agent, or Firm* — Crowell & Moring LLP

(57) ABSTRACT

The invention discloses a logon system and a method thereof, which relates to information security field. The invention solves the problems that the user can log on Windows by username and password only. In the invention, the Credential Provider module adapted to pop up a human-computer interactive interface when the Credential Provider module is called by the operating system of the computer; further adapted to collect the information needed for logging on the operating system and transfer the collected information to the operating system of the computer; the Cryptographic Service Provider module is adapted to perform authentication with the information received from the operating system of the computer; and, if the authentication is successful, to perform operation with the corresponding private key of the key device logon certificate to generate credential information needed for logging on the operating system. The embodiments of the invention are applied for logging on the Windows, which provide more alternative logon ways for the user.

20 Claims, 7 Drawing Sheets

US 8,613,060 B2

LOGON SYSTEM AND METHOD THEREOF

FIELD OF THE INVENTION

The present invention relates to information security field, more particularly, relates to a logon system and a method thereof.

BACKGROUND OF THE INVENTION

In the Windows, the process of the user logon is as following. With the load of the Windows, Local Security Authority (LSA) process calls windows logon (Winlogon) process; the Winlogon process calls Logon User Interface (Logon UI) process and pops up a human-computer interactive interface; a user inputs authentication information including username and password in the human-computer interactive interface; logon UI process enumerates the authentication information input by the user and registers the information in all of the Credential Provider (CP) under the path of registry table; the Credential Provider collect credential of the user and return the credential to the Winlogon process. The Winlogon process provides the obtained credential to LSA; LSA calls corresponding Cryptographic Service Provider (CSP) according to the credential to authenticate the identity of the user.

In practice, varieties of authentication ways are adapted in order to improve the security for the user to logon system. However, in the prior art, the human-computer interactive interface popped up by Windows is for the user to input username and password only. So the logon system in the prior art permits the user to logon by inputting username and password only. If the user uses the authentication way except of inputting user name and password to logon the system, Windows will not pop up the corresponding human-computer interactive interface to prompt the user and provide for user to input authentication information to authenticate the identity of the user as well.

SUMMARY OF THE INVENTION

The present invention provides a logon system and the method thereof. The present invention make the Windows can pop up the human-computer interactive interface corresponding to the authentication way in order to provide the user to logon the system by many more authentication ways.

In order to gain the above point, the present invention employs the technical solution as following:

A logon system, wherein the logon system comprising a computer and a intelligent key device, the computer comprising:
  a Credential Provider module, adapted to pop up a human-computer interactive interface when the module is called by the computer operating system, and further adapted to collect information needed for logging on the computer operating system and to transfer the collected information to the computer operating system; and
  a Cryptographic Service Provider module, adapted to receive the information from the computer operating system and perform authentication with the information and, to perform operation with the private key corresponding to the intelligent key device logon certificate to generate credential information needed for logging on the operating system in case the authentication is successful.

A logon method, wherein the method comprising the steps of:

popping up, by a Credential Provider module, a human-computer interactive interface when the Credential Provider module is called by the computer operating system;
  collecting, by the Credential Provider module, information needed for logging on the operating system and transferring the collected information to the operating system;
  performing, by the Credential Provider module, authentication with received information, and performing operation with the private key corresponding to the key device logon certificate to generate credential information needed for logging on the operating system in case the authentication is successful.

The logon system and method thereof provided by the embodiments of the present invention can pop up human-computer interactive interface corresponding to the manner of authentication. That gets over the problem in the prior that the operating system of the computer only pops up human-computer interactive interface comprising controls for user to input username and password, and thus the user is allowed to log on the system only by the authentication way of inputting username and password. The technical solution provides more alternative ways of authentication for the user to logon the Windows. Furthermore, the information security is improved.

DETAILED DESCRIPTION OF THE INVENTION

Objects, technical solutions and advantages of the invention will be easily understood by reference to the following description of embodiments when read in conjunction with the accompanying drawings.

Embodiment 1

Figure 1:
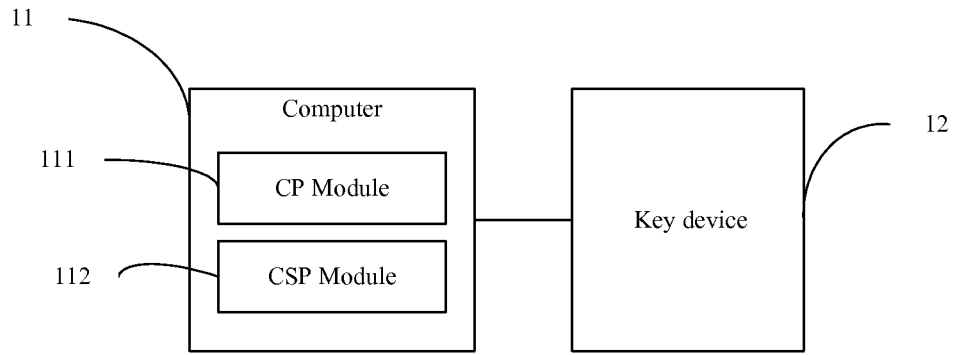
FIG. 1 is a block diagram of the logon system according to the first embodiment of the present invention.

The embodiment discloses a logon system, shown in FIG. 1, which includes a computer 11 and a key device 12. The computer 11 includes a CP (Credential Provider) module 111 and a CSP (Cryptographic Service Provider) module 112.

After the connection between the key device 12 and the computer 11 is set up, the operating system of the computer 11 is adapted to call the CP module 111 corresponded to the key device according to the key device logon certificate in the key device 12 and pop up a human-computer interactive interface as well. The CP module 111 is adapted to collect the information needed for user to log on the operating system by using the key device logon certificate and the popped human-computer interactive interface, and then transfer the collected information to the operating system of the computer 11. The operating system of the computer 11 further is adapted to transfer the collected information to the CSP module 112 corresponding to the key device logon certificate in the key device 12.

In the embodiment, collecting the information needed for logging on the operating system by the CP module 111 can be implemented by calling the interface function GetSerialization in the CP module 111 by the operating system of the computer. Interface functions in the CP module further include
Provider::CreateInstance
Provider::SetUsageScenario (CPUS_LOGON)
Credential::Initialize
Provider::Advise
Provider::GetCredentialCount
Provider::GetCredentialAt (dwIndex=0)
Provider::GetFieldDescriptorCount
Provider::GetFieldDescriptorAt (dwIndex=0)
Provider::GetFieldDescriptorAt (dwIndex=1)
Provider::GetFieldDescriptorAt (dwIndex=2)
Provider::GetFieldDescriptorAt (dwIndex=3)
Provider::GetFieldDescriptorAt (dwIndex=4)
Credential::GetBitmapValue (dwFieldID=0; tile image)
Credential::GetStringValue (dwFieldID=1; user name field)
Credential::GetFieldState (dwFieldID=1; user name field)
Credential::GetStringValue (dwFieldID=2; password field)
Credential::GetFieldState (dwFieldID=2; password field)
Credential::GetSubmitButtonValue (dwFieldID=3; submit button)
Credential::GetFieldState (dwFieldID=3; submit button)
Credential::GetStringValue (dwFieldID=4; domain name field)
Credential::GetFieldState (dwFieldID=4; domain name field)
Credential::SetSelected
Credential::Advise
Credential::UnAdvise
Provider::UnAdvise
[The WinLogon process calls LogonUser]
Credential::Advise
Credential::ReportResult (nts Status=0)
Credential::UnAdvise In the interface function CreateInstance, the CP module declares that the type of itself is the credential provider of the key device type.

The CSP module 112 is adapted to receive the information transferred from the operating system of the computer 11 and then perform authentication with the information. If the authentication is authenticated successfully (the key device permits the CSP module to use private key stored in the key device), the CSP module 112 further adapted to perform operation on the private key corresponded to the key device logon certificate and generate the credential information needed for logging on the operating system.

In the embodiment, receiving the information transferred from the operating system of the computer by the CSP module 112 can be implemented by calling the interface function CryptSetProvParam in the CSP module by the operating system of the computer. Interface functions in the CSP module further include:

CryptAcquireContext
CryptReleaseContext
CryptGetProvParam
CryptEncrypt
CryptDecrypt
CryptCreateHash
CryptHashData
CryptSetHashParam
CryptGetHashParam
CryptDestroyHash
CryptSignHash
CryptVerifySignature
CryptGenKey
CryptDestroyKey
CryptSetKeyParam
CryptGetKeyParam
CryptExportKey
CryptImportKey
CryptGetUserKey
CryptDeriveKey
CryptGenRandom
CryptHashSessionKey The logon system provided by the embodiment employs the solution as following: collecting the authentication information needed for logging on the key device via the popped human-computer interactive interface, and generating the credential information of the logon system with the private key which is obtained after logging on the key device. The solution provides more authentication ways for user to log on the Windows and prevents the illegitimate user from logging on the system and accessing the controlled information, which enhances the security.

Embodiment 2

Figure 2:
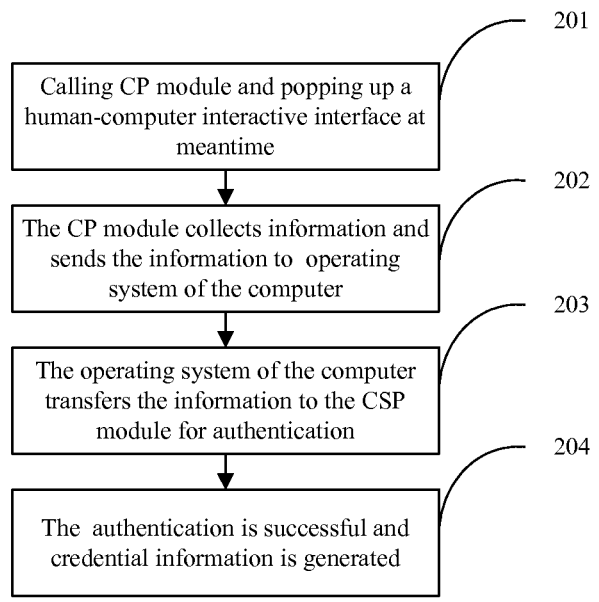
FIG. 2 is a flow chart of the logon method according to the second embodiment of the present invention.

The embodiment discloses a logon method, as shown in FIG. 2, which includes:

Step 201, when the connection between a computer and a key device is set up, the operating system of the computer calls a corresponding CP module according to the key device logon certificate in the key device and pops up a human-computer interactive interface as well.

Step 202, the CP module collects information needed for logging on the operating system via the key device logon certificate and the popped human-computer interactive interface and transfers the collected information to the operating system of the computer.

Step 203, the CSP module corresponded to the CP module described above receives the information transferred from the operating system of the computer and then performs authentication with the collected information.

Step 204, if the authentication is successful (the key device permits the CSP module to use private key stored in the key device), the CSP module performs operation on private key corresponded to the key device logon certificate and generates credential information needed for logging on the operating system.

Embodiment 3

The embodiment is exemplified fingerprint authentication. The human-computer interactive interface of the operating system in the embodiment includes output control. The key device is a USB KEY with fingerprint authentication module. Before the CSP module uses private key stored in the key device, a user is prompted to complete the fingerprint authentication; otherwise, the private key can not be used. Accordingly, the human-computer interactive interface is output control interface for prompting the user to input fingerprint for authentication.

Figure 3:
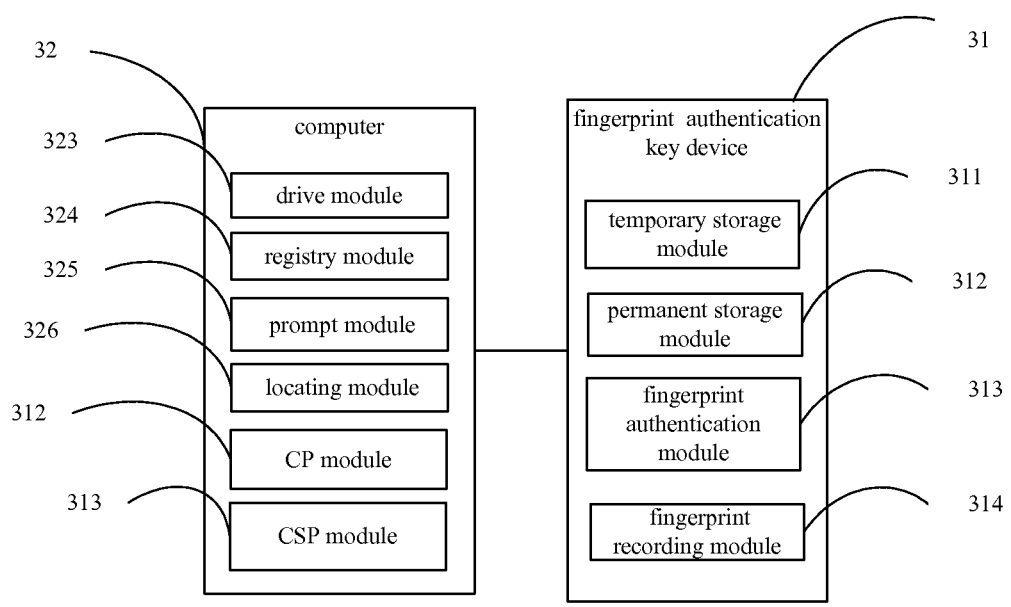
FIG. 3 is a block diagram illustrating a logon system adapted finger print authentication according to the third embodiment of the present invention.

As shown in FIG. 3, the system includes a fingerprint authentication key device 31 and a computer 32. The computer 32 includes a CP module 321, a CSP module 322, a drive module 323, a registry module 324, a prompt module 325 and a locating module 326; the fingerprint authentication key device 31 includes a temporary storage module 311, a permanent storage module 312, a fingerprint authenticating module 313 and a fingerprint recording module 314.

The drive module 323 is adapted to perform data exchange between the fingerprint authentication key device 31 and the computer 32 when the connection between the fingerprint authentication key device 31 and the computer 32 is set up; the registry module 324 is adapted to enumerate and register one or more key device logon certificate and associate the key device logon certificates to the corresponding CP module and the CSP module respectively after the drive module 323 worked; the prompt module 325 is adapted to display at least one registered key device logon certificate in the predefined interface and prompt the user to choose one from the at least one key device logon certificate displayed; the locating module 326 is adapted to locate corresponding CP module 321 and CSP module 322 according to the key device logon certificate chosen by the user; the CP module 321 is adapted to pop up a human-computer interactive interface including output control for prompting the user to input fingerprint authentication information when it is called by the computer 32, and sends a prepare command to the fingerprint authentication key device 31 at the same time; the CP module 321 is further adapted to collect information needed for logging on the operating system and transfer the collected information to the operating system of the computer 32; after receiving the information from the operating system of computer 32, the CSP module 322 is further adapted to perform authentication with the received authentication information.

The drive module 323 provides Personal computer/Smart Card interface, also called PC/SC interface, which is a standard framework defined for the key device to access the Windows platform (including Windows2000). The operating system of the computer can monitor whether the key device is plugged in or not and communicate with the key device via PC/SC interface.

In the embodiment, the drive module can be PC/SC driver based on the USB protocol. Accordingly, the key device is USB KEY, which declares itself as USB device matched the drive module.

The drive module also can be a card reader or PC/SC driver corresponding to the card reader. Accordingly, the key device is a smart card.

The drive module also can be smart card communication protocol driver based on USB (such as CCID driver). Accordingly, the key device is a USB KEY, which declares itself as CCID device when it is connected to the computer.

The information needed for logging on the operating system collected by the CP module 321 may include the information in the key device logon certificate chosen by the user according to the prompt of the prompt module 325 and the authentication information;

if the authentication information transferred to the operating system of the computer 32 by the CP module 321 is blank information, the CSP module 322 authenticates the blank information; the CSP module 322 is also adapted to transfer authenticating command to the key device 31 after the authentication is performed.

The fingerprint recording module 314 is adapted to receive fingerprint authentication information entered by the user after receiving the prepare command transferred from the CP module, and to inform the CP module 321 to close the human-computer interactive interface after receiving the fingerprint authentication information entered by the user; the temporary storage module 311 is adapted to store the received fingerprint authentication information to the temporary memory area of fingerprint authentication key device 31; the permanent storage module 312 is adapted to pre-store the original fingerprint information in the permanent storage area of the fingerprint authentication key device 31; the authenticating module 313 is adapted to compare the received fingerprint authenticating information with the original fingerprint information after receiving the authenticating command transferred from the CSP module 322; if the authentication is performed by the fingerprint authenticating module 313 successfully, the CSP module 322 performs operation with the private key stored in the key device 31 and corresponded to the key device logon certificate chosen by the user, and generates credential information needed for logging on the system and logs on the operating system with the credential information.

Embodiment 4

Figure 4:
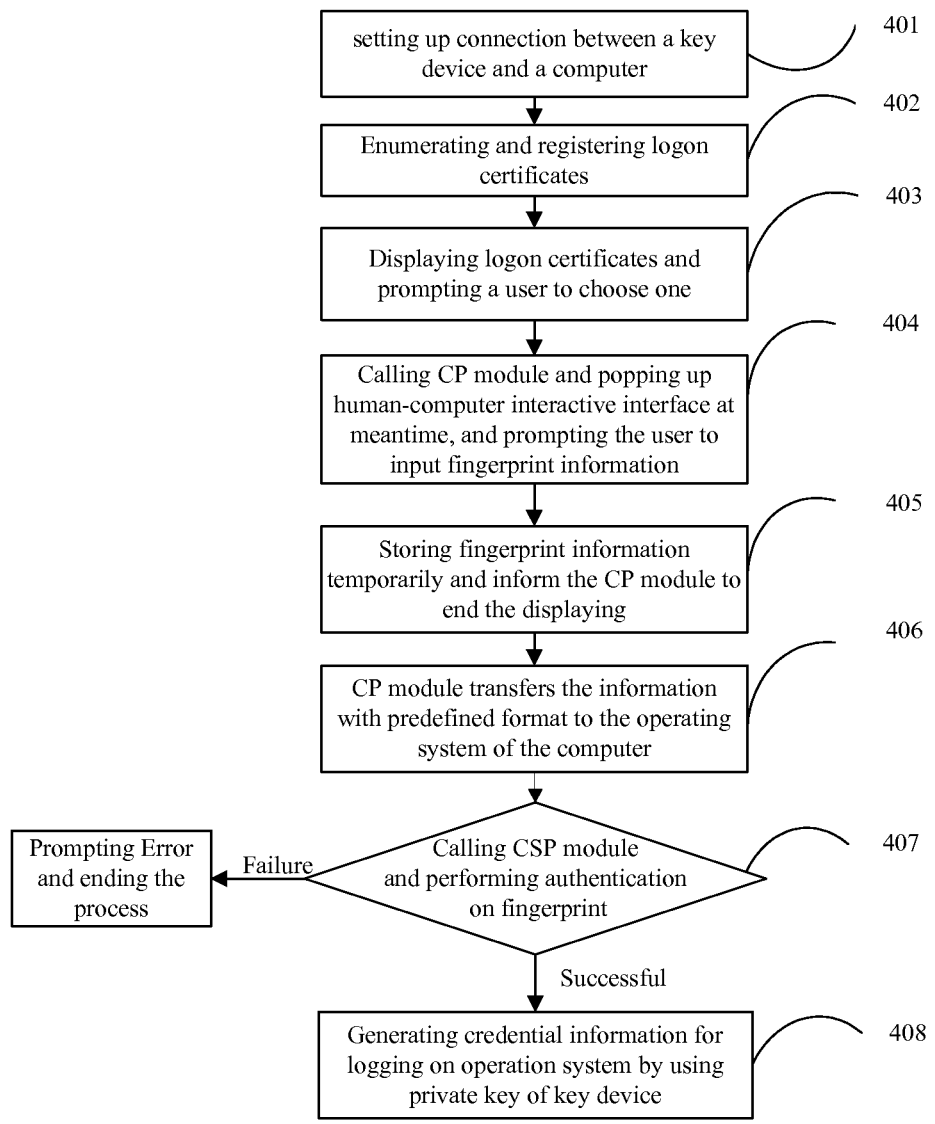
FIG. 4 is a flow chart illustrating a logon method adapted finger print authentication according to the fourth embodiment of the present invention.

Exemplified the USB KEY with fingerprint authentication module as the key device, the embodiment provides a logon method in which the human-computer interactive interface includes out control. Before the CSP module uses the private key stored in the key device, the user is prompted to complete fingerprint authentication; otherwise, private key stored in the key device can not be used. Accordingly, the human-computer interactive interface in the CP module is for prompting the user to output the fingerprint information and performs fingerprint authentication. In the embodiment, the drive module is PC/SC drive based on USB protocol. As shown in FIG. 4, the method includes:

registering the information of the CP and the CSP to the registry table of Windows of the computer and setting the logon options for USB key, i.e. key device.

Step 401, the key device connects to the computer and declares itself as a USB device.

Step 402, the operating system of the computer communicates with the key device via the drive module, and enumerates and registers one or more key device logon certificates in the key device.

In the process of registering, the corresponding CP module and CSP module are associated to the key device logon certificate respectively.

Step 403, the operating system of the computer displays at least one registered key device logon certificate on logon page for the user to choose.

The operating system of the computer determines the CP module and the CSP module to be called according to the certificate chosen by the user, and calls the CP module to set up the parameters needed for logging on the operating system and calls the CSP module to generate the credential information needed for logging on the operating system.

Step 404, when the GetSerialization interface of the CP module is called, the CP module pops up the human-computer interactive interface including output control and waits for performing fingerprint authentication for the user.

Meanwhile, the CP module sends a prepare command to the key device, the key device prepare to receive fingerprint authentication information input by the user after receiving the prepare command.

Step 405, the user scans the fingerprint information via the key device, the key device receives the scanning result and saves the result temporarily in the key device and informs the CP module to end the displaying of the human-computer interactive interface.

Step 406, the CP module transfers the information with predefined format to the operating system of the computer.

The information with predefined format is defined as the following:

```
Typedef struct _CREDENTIAL_PROVIDER_CREDENTIAL_SERIALIZATION
{
ULONG ulAuthenticationPackage;
GUID clsidCredentialProvider;
ULONG cbSerialization;
byte *rgbSerialization;
} CREDENTIAL_PROVIDER_CREDENTIAL_SERIALIZATION;
```

The rgbSerialization points to the data structure of the specific generated credential information, the definition is as the following:

```
typedef struct _KERB_CERTIFICATE_LOGON
{
KERB_LOGON_SUBMIT_TYPE MessageType;
UNICODE_STRING DomainName;
UNICODE_STRING UserName;
UNICODE_STRING Pin;
ULONG Flags;
ULONG CspDataLength;
PUCHAR CspData;
} KERB_CERTIFICATE_LOGON,
*PKERB_CERTIFICATE_LOGON.
```

The field of Pin is the PIN code for accessing the key device. In the embodiment, the field of Pin is blank.

DomainName is the domain name recorded in the key device logon certificate chosen by the user. Username is the user name recorded in the key device logon certificate chosen by the user. CspData is the specific data package of parameters needed for the CSP module to generate the credential information, the format is as following:

```
typedef struct _KERB_SMARTCARD_CSP_INFO {
    DWORD dwCspInfoLen;
    DWORD MessageType;
    union {
        PVOID ContextInformation;
        ULONG64 SpaceHolderForWow64;
    };
    DWORD flags;
    DWORD KeySpec;
    ULONG nCardNameOffset;
    ULONG nReaderNameOffset;
    ULONG nContainerNameOffset;
    ULONG nCSPNameOffset;
    TCHAR bBuffer;
} KERB_SMARTCARD_CSP_INFO,
*PKERB_SMARTCARD_CSP_INFO;
```

The detailed parameters such as name of CSP module, name of the key container corresponding to the key device logon certificate chosen by the user are recorded in the data structure.

Step 407, When the CryptSetProvParam interface function of CSP module is called, the CSP module informs the key device to perform authentication of fingerprint information, the key device reads the cached fingerprint information and compares it with the stored fingerprint information, if they are matched, go to step 408, otherwise, error is prompted and the process is ended.

Step 408, the operating system of the computer calls CSP module to perform operation with the private key corresponding to the key device logon certificate chosen by the user in the key device and generate credential information needed for logging on the operating system of the computer and completes the logon of the operating system of the computer via the key device.

At that time, the user has completed the fingerprint authentication successfully. So it is possible that the operating system of the computer performs operation with the private key smoothly and completes the logon process.

For the user who wants to logon Windows of the computer by fingerprint authentication, from one aspect, the logon method provided by the embodiment adapts popping up a human-computer interactive interface prompted the user to input fingerprint. The user can logon the Windows of the computer by fingerprint authentication. In the prior art, only the human-computer interactive interface for the user to input username and password is popped up. So there are little alternative ways of authentication for the user. The technical solution provides more alternative ways of authentication for the user to logon the Windows. Furthermore, fingerprint authentication is securer than the authentication of inputting username and password.

The fingerprint authentication can be substituted by other biotic authentication ways such as audio authentication, palm-print authentication or iris authentication etc. That is to say, logon methods using other biotic authentication ways can be adapted in the embodiment.

Embodiment 5

Exemplified one time password (OTP) authentication, the embodiment provides a logon system in which the human-computer interactive interface includes multiple input controls.

In the embodiment, the key device is a CCID USB KEY with OTP authentication module. The CSP module generates and displays OTP before using the private key stored in the key device. The user has to input the predefined PIN code and the generated OTP; otherwise, the private key in the key device can not be used. Accordingly, the human-computer interactive interface popped up from CP module has two input controls.

In the embodiment, the drive module is based on the CCID driver preload in the operating system of the computer. Accordingly, the key device is USB KEY.

Figure 5:
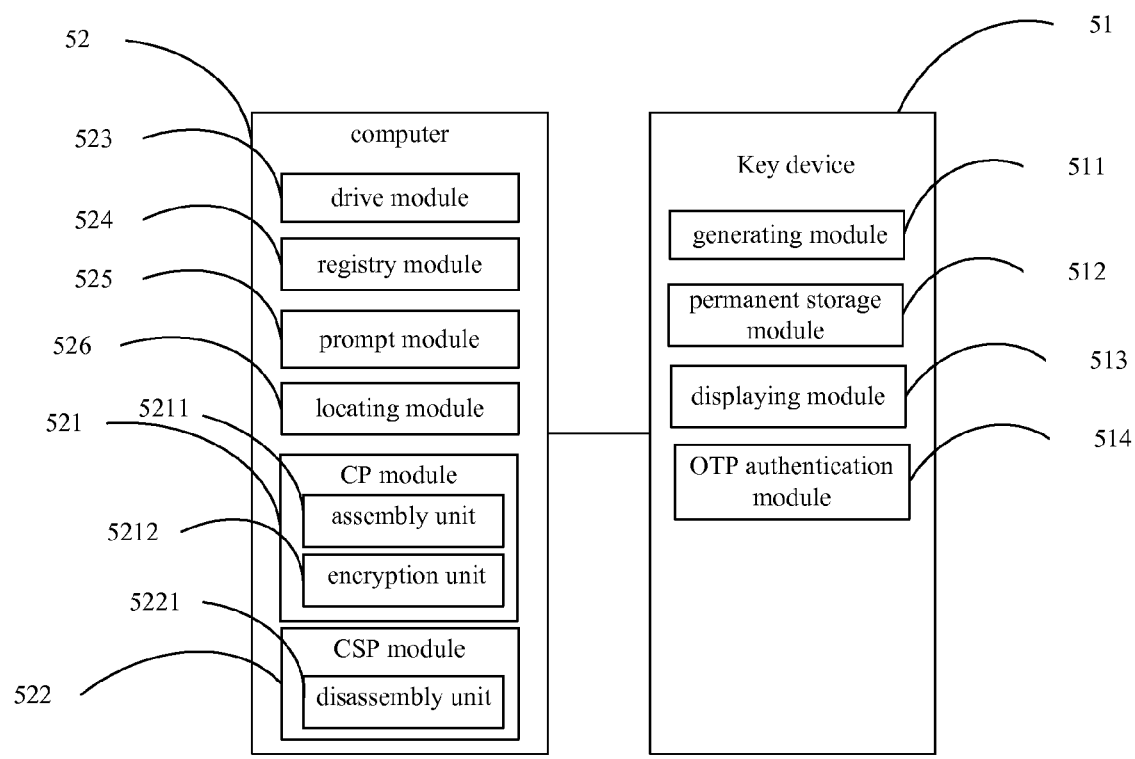
FIG. 5 is a block diagram illustrating a logon system adapted OTP authentication according to the fifth embodiment of the present invention.

As shown in FIG. 5, the system includes a key device 51 and a computer 52. The computer 52 includes a CP module 521, a CSP module 522, a drive module 523, a registry module 524, a prompt module 525 and a locating module 526; the key device 51 includes a generating module 511, a permanent storage module 512, a displaying module 513 and an OTP authentication module 514.

The drive module 523 is adapted to perform data exchange between the key device 51 and the computer 52 after the connection between the key device 51 and the computer 52 is set up; the registry module 524 is adapted to enumerate and register one or more key device logon certificates and associate the key device logon certificates to the corresponding CP module and the CSP module respectively after the drive module 523 worked; the prompt module 525 is adapted to display at least one registered key device logon certificate in the predefined interface and prompt the user to choose one from at least one key device logon certificate displayed; the locating module 526 is adapted to locate corresponding CP module 521 and CSP module 522 according to the key device logon certificate chosen by the user; the CP module 521 is adapted to pop up a human-computer interactive interface including PIN code input window interface and OTP input window interface when the operating system of the computer 52 is called, and sends a prepare command to the key device 51 at the same time; the CP module 521 is further adapted to collect information needed for logging on the operating system and transfer the authentication information in the collected information to the operating system of the computer 52; the operating system of computer 52 is further adapted to transfer the received information to the CSP module 522; after receiving the information from the operating system of computer 52, the CSP module 522 is adapted to perform authentication with the received information.

The information needed for logging on the operating system collected by the CP module 521 includes the information in the key device logon certificate, which is chosen by the user according to the prompt of the prompt module 525, and the authentication information received by the CP module 521. The CP module 521 transfers the authentication information to the operating system of the computer 52 and then the CSP module 522 authenticates the received authentication information (i.e. PIN code and OTP).

The generating module 511 is adapted to generate OTP after receiving generating command; the displaying module 513 is adapted to display the OTP generated by the generating module 511; the permanent storage module 512 is adapted to store the original PIN code; the OTP authentication module 514 is adapted to authenticate the OTP; and if the PIN code stored in the permanent storage module 512 is matched with the dynamic password generated by the generating module 511, the authentication is successful; the CSP module 522 is further adapted, after the authentication performed by the OTP authentication module 514 is successful, to perform operation with the private key corresponding to the key device logon certificate chosen by the user in the key device 51 and generate credential information needed for logon and log on the operating system according to the credential information.

The CP module 521 in the embodiment includes an assembly unit 5211 and an encryption unit 5212.

The assembly unit 5211 is adapted to assembly the collected authentication information; the encryption unit 5222 is adapted to encrypt the collected authentication information assembled by assembly unit 5211.

The CSP module 522 in the embodiment includes a disassembly unit 5221 adapted to disassembly the received authentication information.

Embodiment 6

Exemplified one time password (OTP) authentication, the embodiment provides a logon method in which the human-computer interactive interface includes multiple input controls.

In the embodiment, the key device is a CCID USB KEY with OTP authentication module. The CSP module generates and displays OTP before using the private key stored in the key device. The user has to input the predefined PIN code and the generated OTP via the computer; otherwise, the private key in the key device can not be used. Accordingly, the human-computer interactive interface popped up from CP module has two input controls.

In the embodiment, the drive module is preload CCID driver based on the operating system; accordingly, the key device is a USB KEY.

Figure 6:
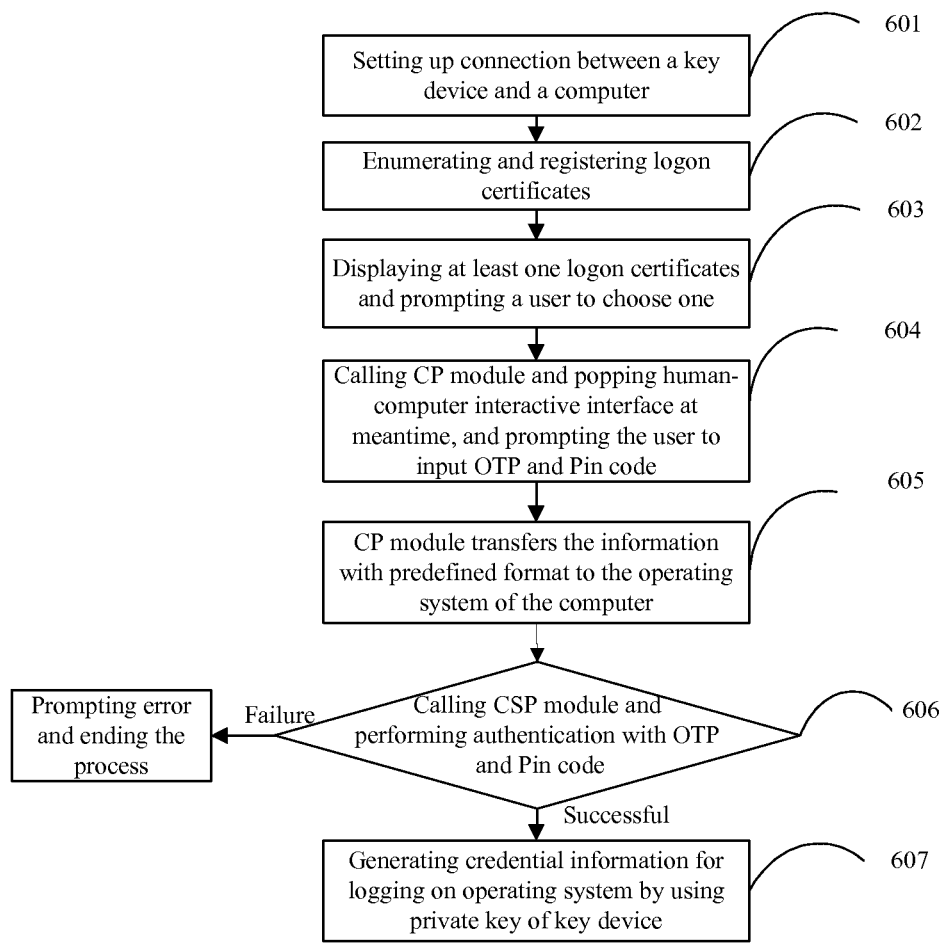
FIG. 6 is a block diagram illustrating of a logon method adapted OTP authentication according to the sixth embodiment of the present invention.

As shown in FIG. 6, the method includes:

registering the information of CP and CSP to the registry table of the Windows Vista system of computer and setting the USB key (i.e. key device) logging on options.

Step 601, the key device is connected to the computer and declares itself as a USB device.

Step 602, the operating system of the computer communicates with the key device via the drive module, and enumerates and registers one or more key device logon certificates in the key device.

In the process of registering, the corresponding CP module and CSP module are associated to the key device certificate respectively.

Step 603, the operating system of the computer displays at least one registered key device logon certificate on logon page for the user to choose.

The operating system of the computer determines the CP module and the CSP module to be called according to the key device logon certificate chosen by the user, and, in the subsequent operation, calls the CP module to set up the parameters for logging on the operating system and calls the CSP module to generate the credential information needed for logging on the operating system.

Step 604, when the GetSerialization interface function of the CP module is called, the CP module pops up the human-computer interactive interface including PIN code input window interface and OTP input window interface and waits for the user to input the authenticating information (i.e. PIN code and OTP).

Meanwhile, the CP module sends generating command to the key device; the key device generates an OTP after receiving the generating command and displays the OTP in the displaying window of the key device. The OTP displayed is for the user to input in the input control.

Step 605, the CP module transfers the information with predefined format to the operating system of the computer.

In the embodiment, what filled in the field of PIN code of the information with predefined format is encrypted assembly of the OTP and the PIN code entered by the user. The methods is assembling OTP and PIN code together and then performing encryption with the CredProtect interface function provided by the operating system of the computer.

Step 606, when the CryptSetProvParam interface of the CSP module is called, the CSP module receives data transferred by the operating system via the parameter pbData, and then disassemblies the data to obtain the OTP and PIN code and performs authentication, if the authentication is successful, go to step 607; otherwise, error is prompted and the process is ended.

The operating system of the computer decrypts the field of the PIN after receiving the information with predefined format, and then transfers the decrypted field to the CSP module.

In the embodiment, the length of OTP is a constant value, so the OTP and PIN code can be obtained conveniently by disassembly process.

Step 607, the operating system of the computer calls CSP module to perform operation with the private key corresponding to the key device logon certificate chosen by the user in the key device and generate credential information needed for logging on the operating system of the computer and complete the logon of the operating system of the computer via the key device.

The user passed the OTP authentication successfully. So it is possible that the operating system of the computer performs operation with the private key smoothly and completes the logon process.

In the prior art, when the user logs on the operating system of the computer, the user can not log on the operating system of the computer by OTP authentication because the popped human-computer interactive interface only support the authentication of inputting username and password. By popping up the human-computer interactive interface comprising multiple input controls including PIN code and OTP when logon the system the user can log on the operating system of the computer with OTP authentication. The solution not only provides an alternative way for logging on system but also improves the security of the logging on the system.

Embodiment 7

In the embodiment, the key device is a smart card with challenge responding authentication module. Before the CSP module using the private key stored in the key device, the key device generates a challenge code and the user obtains a verification code generated by a preset device and transfers the verification code via the computer to the key device to authenticate; otherwise the private key stored in the key device can not be used. Accordingly, the human-computer interactive interface popped by CP module has an input control and at least one output control.

In the embodiment, the drive module is a card reader and corresponding PC/SC driver. Accordingly, the key device is a smart card.

Figure 7:
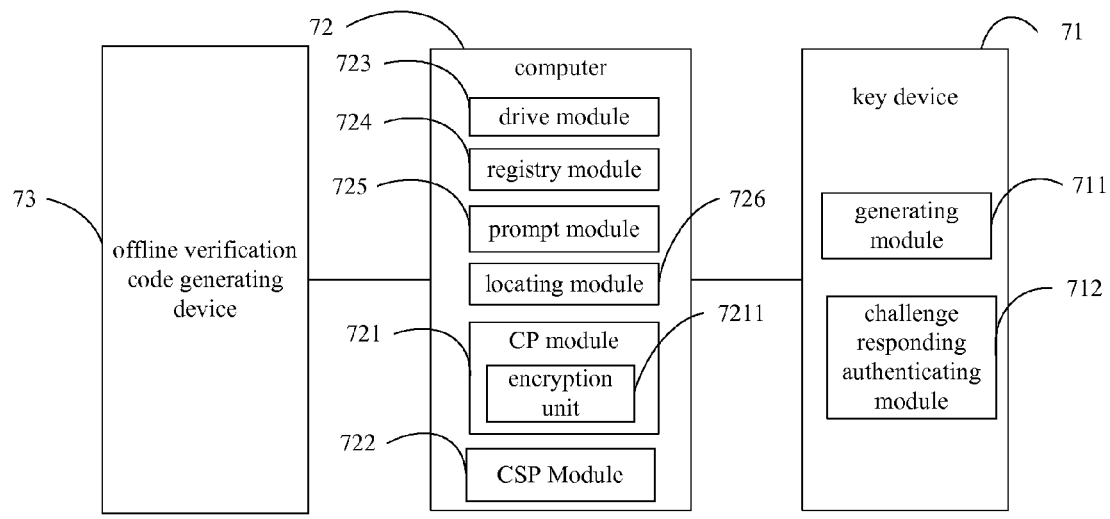
FIG. 7 is a block diagram illustrating a logon system adapted challenge code authentication according to the seventh embodiment of the present invention.

As shown in FIG. 7, the system includes a key device 71, a computer 72 and an offline verification code generating device 73. The computer 72 includes a CP module 721, a CSP module 722, a drive module 723, a registry module 724, a prompt module 725 and a locating module 726; the key device 71 includes a generating module 711 and a challenge responding authenticating module 712.

The offline verification code generating device 73 is adapted to generate and display a corresponding verification code after receiving the challenge code input by the user.

The drive module 723 is adapted to perform data exchange between the key device 71 and the computer 72 after the connection between the key device 71 and the computer 72 is set up; the registry module 724 is adapted to enumerate and register one or more key device logon certificates and associate the key device logon certificates to the corresponding CP module and the CSP module respectively after the drive module 723 worked; the prompt module 725 is adapted to display the registered at least one key device logon certificate in the predefined interface and prompt the user to choose one from at least one of key device logon certificate displayed; the locating module 726 is adapted to locate corresponding CP module 721 and CSP module 722 according to the key device logon certificate chosen by the user; the CP module 721 is adapted to pop up a human-computer interactive interface including an authentication information input window interface and a challenge code output window interface when the operating system of the computer 72 is called, and sends a generating command to the key device 71 at the same time; the CP module 721 is further adapted to collect information needed for logging on the operating system and transfer the authentication information in the collected information to the operating system of the computer 72; after receiving the information from the operating system of computer 72, the CSP module 722 is adapted to perform authentication with the received authentication information.

The information needed for logging on the operating system collected by the CP module 721 includes the information in the key device logon certificate chosen by the user according to the prompt of the prompt module 725 and the authentication information (i.e. verification code) collected by the CP module. The CP module 721 transfers the authentication information to the operating system of the computer 72 and the CSP module 722 performs authentication with the received authentication information.

The generating module 711 is adapted to generate a challenge code after receiving the generating command transferred by the CP module; the challenge responding authenticating module 712 is adapted to authenticate the verification code generated by the offline verification code generating device 73; if the verification code is matched with the verification code pre-stored in the key device 71, the authentication is successful; otherwise, error is prompted and the process is ended. The CSP module 722 is further adapted to perform operation with the private key, which is corresponding to the key device logon certificate chosen by the user, stored in the key device 71 and generate credential information needed for logon and log on the operating system with the credential information.

In the embodiment, the CP module 721 further includes an encrypting unit 721 which is adapted to encrypt the authentication information.

Embodiment 8

In the embodiment, the key device is a smart card with challenge responding authentication module. Before the CSP module using the private key stored in the key device, the key device generates a challenge code and the user obtains a authentication code by a preset device and transfers the verification code via the computer to the key device for authentication, otherwise, the private key in the key device can not be adapted. Accordingly, the human-computer interactive interface popped by a CP module has an input control and at least one output control.

Figure 8:
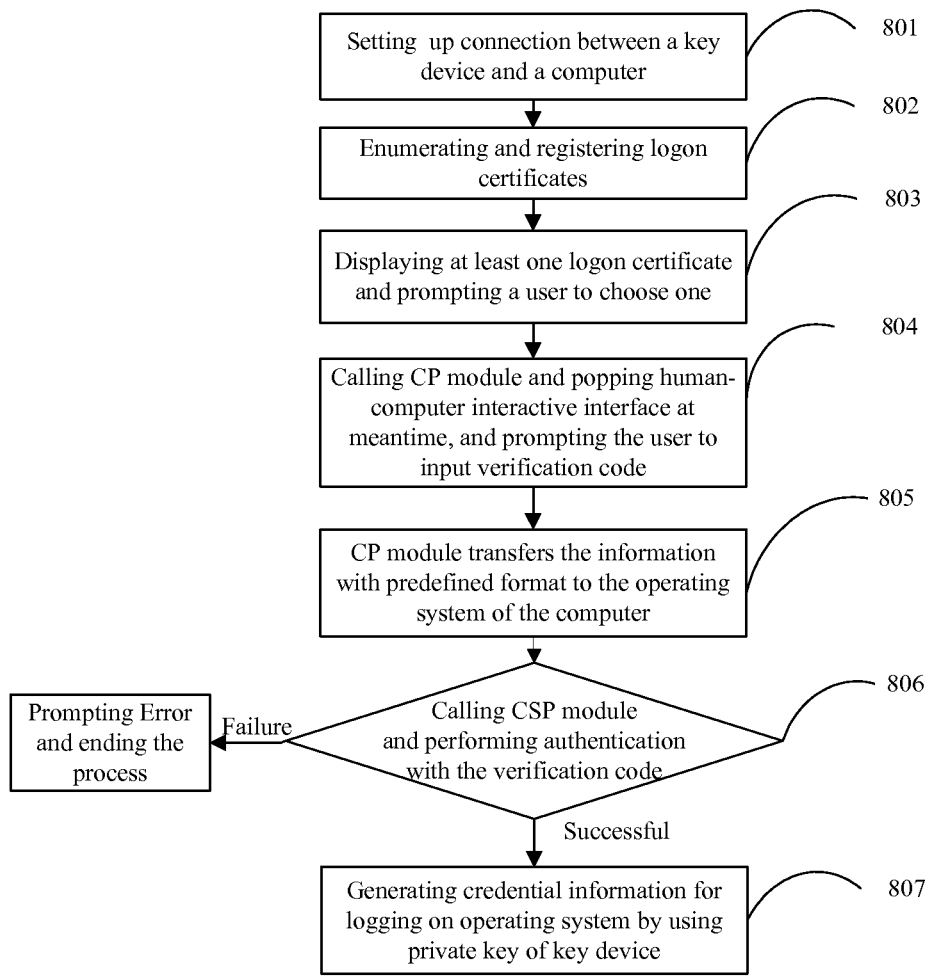
FIG. 8 is a block diagram illustrating of a logon method adapted challenge code authentication according to the eighth embodiment of the present invention.

In the embodiment, the drive module is a card reader and corresponding PC/SC driver. Accordingly, the key device is a smart card. When the human-computer interactive interface includes input control and output control, the logon method, as shown in FIG. 8, includes that:

Registering the information of CP and CSP to the registry table of the Windows of computer and setting the USB key (i.e. key device) logging on options. The offline verification code generating device is match with the key device.

Step 801, the key device is connected to the computer and declares itself as a USB device;

Step 802, the operating system of the computer communicates with the key device via the drive module, enumerates and registers one or more key device logon certificates in the key device.

In the process of registering, the corresponding CP module and CSP module are associated to the key device certificates respectively.

Step 803, the operating system of the computer displays at least one registered key device logon certificate on logon page for the user to choose.

The operating system of the computer determines the CP module and the CSP module to be called according to the key device logon certificate chosen by the user, and calls the CP module in the subsequent process to set up the parameters for logging on the operating system and calls the CSP module to generate credential information needed for logging on the operating system.

Step 804, when the GetSerialization interface function of the CP module is called, the CP module informs the key device to generate a challenge code and pops out a human-computer interactive interface, displays challenge code and waits for the user to input the verification code.

In the embodiment, the human-computer interactive interface includes verification code input windows interface and challenge code output window interface.

In the embodiment, the user inputs the displayed challenge code into the offline verification code generating device, the offline verification code generating device generates a corresponding verification code according to the challenge code which the user input and displayed the verification code. The verification code is the code that the user has to input into the verification code input window interface.

Step 805, the CP module transfers the information with predefined format to the operating system of the computer.

In the embodiment, what filled in the field of PIN code of the information with predefined format is the result of the input verification code encrypted with the CredProtect interface function provided by the operating system of the computer.

Step 806, when the CryptSetProvParam interface function of CSP module is called, the CSP module receives the authentication information (i.e. verification code) which is transferred from the operating system of the computer via the parameter pbData and performs authentication with the authentication information; if the authentication is successful, go to step 807; otherwise, error is prompted and the process is ended.

Step 807, the operating system of the computer calls CSP module to perform operation with the private key corresponding to the key device logon certificate chosen by the user in the key device and generate credential information needed for logging on the operating system of the computer and can log on the operating system of the computer via the key device.

Now, the user has passed the authentication successfully. So that the operating system of the computer performs operation with the private key smoothly and completes the process of logon system.

The solution provided by the invention discloses a method of logging on Windows via the way of challenge code authentication. The method employs the solution of popping up a human-computer interactive interface with output control containing a challenge code and input controls containing an verification code. So that the user can log on Windows via a key device for challenge code authentication.

The embodiments of the invention, which are mainly applied in the information security field, provides more alternative ways for the user to log on operating system by popping up different human-computer interactive interfaces. The key device in the embodiment is not limited to the key device for fingerprint authentication, the smart card for OTP authentication and the key device for challenge code authentication. Any device with key function is suitable for the embodiment of the invention. For example, the smart card for fingerprint authentication, etc. With the development of the information security technology, the embodiment of the invention may be applied in other sites of the field or similar fields.

From the description of the embodiments above, those skilled in the art will be able to clearly learn that the present invention can be implemented with the help of software with necessary general hardware platform or implemented by hardware only. But in most cases, the prior ways are preferable. The technology solution of the present invention essentially can be embodied in the form of software product. The software product is stored in readable storage medium, such as the software disk, hardware disk or compact disk of the computer, including some commands for making a device such as USB KEY, smart card or software encryption lock perform the method of the embodiment.

It should be noted that the above-mentioned embodiments illustrate rather than limit the invention, and that those skilled in the art will be able to design many alternative embodiments without departing from the scope of the appended claims.

The invention claimed is:

1. A logon system comprising a non-transitory computer-readable medium and a key device, wherein the computer-readable medium comprises computer instructions executable by a processor to cause the processor to perform a logon method of:
   calling, by a computer operating system, a Credential Provider module corresponding to the key device according to a key device logon certificate in the key device;
   popping up, by the Credential Provider module, a human-computer interactive interface when the Credential Provider module is called by the computer operating system;
   collecting, by the Credential Provider module, information needed for logging on the computer operating system;
   transferring, by the Credential Provider module, authentication information in the collected information to the computer operating system;
   receiving, by a Cryptographic Service Provider module, the authentication information from the computer operating system;
   performing, by the Cryptographic Service Provider module, authentication with the authentication information; and
   performing, by the Cryptographic Service Provider module, an operation with a private key corresponding to the key device logon certificate to generate credential information needed for logging on the computer operating system in case authentication is successful,
   wherein before transferring the authentication information in the collected information to the computer operating system, an assembly unit in the Credential Provider module assembles the authentication information, and an encryption unit in the Credential Provider module encrypts the authentication information; and
   wherein a disassembly unit in the Cryptographic Service Provider module disassembles the received authentication information before performing authentication with the authentication information.

2. The logon system as claimed in claim 1, wherein
   the Credential Provider module pops up the human-computer interactive interface when a GetSerialization interface function in the Credential Provider module is called by the computer operating system; and
   the Cryptographic Service Provider module receives the authentication information via a CryptSetProvParam interface function in the Cryptographic Service Provider module from the computer operating system.

3. The logon system as claimed in claim 1, wherein the logon method further comprises:
   performing, by a drive module, data exchange between the key device and the computer after a connection between the key device and the computer is set up;
   enumerating and registering, by a registry module, one or more key device logon certificates after the connection between the key device and the computer is set up;
   associating, by the registry module, the key device logon certificates to the corresponding Credential Provider module and Cryptographic Service Provider module respectively;

displaying, by a prompt module, the registered key device logon certificates in a predefined interface;

prompting, by the prompt module, the user to choose at least one of the registered key device logon certificates; and locating, by a locating module, the corresponding Credential Provider module and Cryptographic Service Provider module according to the registered key device logon certificate chosen by the user.

4. The logon system as claimed in claim 1, wherein the human-computer interactive interface comprises one or more output controls, or multiple input controls, or one or more input controls and one or more output controls.

5. The logon system as claimed in claim 4, wherein when the human-computer interactive interface comprises one or more output controls, the output controls are for prompting the user to input biotic authentication information.

6. The logon system as claimed in claim 5, wherein when the output controls are for prompting the user to input biotic authentication information, the key device stores the biotic authentication information in a temporary storage area of the key device.

7. The logon system as claimed in claim 4, wherein when the human-computer interactive interface comprises multiple input controls, the Credential Provider module collects authentication information input by the user according to a prompt of the human-computer interactive interface.

8. The logon system as claimed in claim 7, wherein the multiple input controls comprise an input control for prompting the user to input a one-time password and an input control for prompting the user to input a PIN code.

9. The logon system as claimed in claim 4, wherein when the human-computer interactive interface comprises one or more input controls and one or more output controls, the Credential Provider module collects authentication information input by the user according to a prompt of the human-computer interactive interface.

10. The logon system as claimed in claim 9, wherein the one or more input controls are input controls for prompting the user to input a verification code; and the one or more output controls are output controls for displaying a generated challenge code.

11. A logon method comprising:
calling, by a computer operating system, a Credential Provider module corresponding to a key device according to a key device logon certificate in the key device;

popping up, by the Credential Provider module, a human-computer interactive interface when the Credential Provider module is called by the computer operating system;

collecting, by the Credential Provider module, information needed for logging on the computer operating system;

transferring, by the Credential Provider module, authentication information in the collected information to the computer operating system;

receiving, by a Cryptographic Service Provider module, the authentication information from the computer operating system;

performing, by the Cryptographic Service Provider module, authentication with the authentication information; and performing, by the Cryptographic Service Provider module, an operation with a private key corresponding to the key device logon certificate to generate credential information needed for logging on the computer operating system in case authentication is successful, wherein before transferring the authentication information in the collected information to the computer operating system, an assembly unit in the Credential Provider module assembles the authentication information, and an encryption unit in the Credential Provider module encrypts the authentication information; and wherein a disassembly unit in the Cryptographic Service Provider module disassembles the received authentication information before performing authentication with the authentication information.

12. The logon method as claimed in claim 11, wherein the Credential Provider module pops up the human-computer interactive interface when a GetSerialization interface function in the Credential Provider module is called by the computer operating system; and the Cryptographic Service Provider module receives the authentication information via a CryptSetProvParam interface function in the Cryptographic Service Provider module.

13. The logon method as claimed in claim 11, wherein the method further comprises:
performing, by a drive module, data exchange between the key device and the computer after a connection between the key device and the computer is set up;

enumerating and registering, by a registry module, one or more key device logon certificates after the connection between the key device and the computer is set up;

associating, by the registry module, the key device logon certificates to the corresponding Credential Provider module and Cryptographic Service Provider module respectively;

displaying, by a prompt module, the registered key device logon certificates in a predefined interface;

prompting, by the prompt module, the user to choose at least one of the registered key device logon certificates; and locating, by a locating module, the corresponding the Credential Provider module and Cryptographic Service Provider module according to the registered key device logon certificate chosen by the user.

14. The logon method as claimed in claim 11, wherein the human-computer interactive interface includes one or more output controls, or multiple input controls, or one or more input controls and one or more output controls.

15. The logon method as claimed in claim 14, wherein when the human-computer interactive interface comprises one or more output controls, the output controls are for prompting the user to input biotic authentication information.

16. The logon method as claimed in claim 15, wherein when the output controls are for prompting the user to input biotic authentication information, the key device stores the biotic authentication information in a temporary storage area of the key device.

17. The logon method as claimed in claim 14, wherein when the human-computer interactive interface includes multiple input controls, the Credential Provider module collects authentication information input by the user according to a prompt of the human-computer interactive interface.

18. The logon method as claimed in claim 17, wherein the multiple input controls comprise an input control for prompting the user to input a one-time password and an input control for prompting a user to input a PIN code.

19. The logon method as claimed in claim 14, wherein
when the human-computer interactive interface comprises
one or more input controls and one or more output controls, the Credential Provider module collects authentication information input by the user according to a prompt of the human-computer interactive interface.

20. The logon method as claimed in claim 19, wherein
the one or more input controls are input controls for prompting the user to input a verification code; and
the one or more controls are output controls for displaying a generated challenge code.

* * * * *